(12) United States Patent
Wake et al.

(10) Patent No.: US 10,538,313 B2
(45) Date of Patent: Jan. 21, 2020

(54) ACTIVE FLOW CONTROL SYSTEM (71) Applicant: Sikorsky Aircraft Corporation, Stratford, CT (US)

(72) Inventors: Brian E. Wake, South Glastonbury, CT (US); Claude G. Matalanis, Longmeadow, MA (US); Patrick Bowles, Manchester, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 323 days.

(21) Appl. No.: 15/525,203

(22) PCT Filed: Nov. 19, 2015

(86) PCT No.: PCT/US2015/061600
§ 371 (c)(1),
(2) Date: May 8, 2017

(87) PCT Pub. No.: WO2016/126301
PCT Pub. Date: Aug. 11, 2016

(65) Prior Publication Data
US 2018/0281932 A1 Oct. 4, 2018

Related U.S. Application Data (60) Provisional application No. 62/083,624, filed on Nov. 24, 2014.

(51) Int. Cl.
*B64C 23/00* (2006.01)
*B64C 7/00* (2006.01)
(Continued)

(52) U.S. Cl.
CPC .............. *B64C 23/005* (2013.01); *B64C 7/00* (2013.01); *B64C 27/10* (2013.01); *H05H 1/2406* (2013.01);
(Continued)

(58) Field of Classification Search
CPC ..... B64C 2230/12; B64C 23/005; B64C 7/00; B64C 27/10
See application file for complete search history.

(56) References Cited

U.S. PATENT DOCUMENTS 3,130,942 A * 4/1964 Fradenburg ............... B64C 7/00
244/17.11
5,758,823 A 6/1998 Glezer et al.
(Continued)

FOREIGN PATENT DOCUMENTS

| WO | 2009073020 A1 | 6/2009 |
| WO | 2012026839 A1 | 3/2012 |
| WO | 2016053997 A1 | 4/2016 |

OTHER PUBLICATIONS

International Search Report and Written Opinion of the International Searching Authority dated Aug. 11, 2016 in related PCT Application No. PCT/US2015/061600, 11 pages.

*Primary Examiner* — Philip J Bonzell
*Assistant Examiner* — Tye William Abell
(74) *Attorney, Agent, or Firm* — Cantor Colburn LLP (57) ABSTRACT

An aircraft is provided and includes a fuselage including a top and a tail, a main rotor apparatus disposed at the top of the fuselage, which rotates one or more rotors to generate lift, and an active flow control (AFC) system. The AFC system includes plasma actuators configured to generate plasma at a location adjacent to the main rotor apparatus and/or at the tail of the fuselage.

13 Claims, 6 Drawing Sheets

(51) Int. Cl.
   *H05H 1/24* (2006.01)
   *B64C 27/10* (2006.01)
   *B64C 27/82* (2006.01)
   *F15D 1/00* (2006.01)

(52) U.S. Cl.
   CPC .. *B64C 2027/8236* (2013.01); *B64C 2230/12* (2013.01); *F15D 1/0075* (2013.01)

(56) References Cited

U.S. PATENT DOCUMENTS

| | | |
|---|---|---|
| 5,813,625 A | 9/1998 | Hassan et al. |
| 6,109,566 A | 8/2000 | Miller et al. |
| 6,203,269 B1 | 3/2001 | Lorber et al. |
| 6,334,753 B1 | 1/2002 | Tillman et al. |
| 6,379,110 B1 | 4/2002 | McCormick et al. |
| 6,869,049 B2 | 3/2005 | Saddoughi |
| 7,083,142 B2 | 8/2006 | Scott |
| 7,229,251 B2 | 6/2007 | Bertolotti et al. |
| 7,530,787 B2 | 5/2009 | Bertolotti et al. |
| 8,157,528 B1 | 4/2012 | Khozikov et al. |
| 8,220,753 B2 | 7/2012 | Silkey et al. |
| 8,267,653 B2 | 9/2012 | Nies et al. |
| 8,308,112 B2 | 11/2012 | Wood et al. |
| 8,382,043 B1 * | 2/2013 | Raghu ............... B64C 21/04 244/1 N |
| 2007/0089795 A1* | 4/2007 | Jacob ............... B64C 23/005 137/827 |
| 2007/0166163 A1* | 7/2007 | Bertolotti ............... B64C 1/00 416/134 A |
| 2008/0122252 A1* | 5/2008 | Corke ............... B62D 35/00 296/180.2 |
| 2009/0121075 A1* | 5/2009 | Marze ............... B64C 11/001 244/17.19 |
| 2009/0173837 A1 | 7/2009 | Silkey et al. |
| 2009/0304511 A1* | 12/2009 | Brannon, III ............ B64C 7/00 416/179 |
| 2012/0248072 A1* | 10/2012 | McClure ............... B64C 23/005 219/121.5 |
| 2013/0327879 A1 | 12/2013 | Scott et al. |
| 2015/0264794 A1* | 9/2015 | Roy ............... H05H 1/2406 313/231.31 |

\* cited by examiner

ACTIVE FLOW CONTROL SYSTEM

CROSS-REFERENCE TO RELATED APPLICATIONS

The present application is a 371 National Stage of International Patent Application No. PCT/US2015/061600, filed on Nov. 19, 2015, which claims priority to U.S. Provisional Application No. 62/083,624, filed on Nov. 24, 2014, the contents of which are incorporated herein by reference in their entirety.

BACKGROUND OF THE INVENTION

The subject matter disclosed herein relates to an active flow control system and, more particularly, to an active flow control system for enhanced high-speed co-axial rotorcraft performance.

Gas flow in the shear layer adjacent to a surface exhibits a reduction in velocity due to friction of the molecular viscosity interacting with the surface, which results in a strong velocity gradient as a function of perpendicular distance from the surface: essentially zero at the surface and increasing to mainstream velocity at the outer edge of the boundary layer. The reduced velocity results in a lower momentum flux, which is the product of the density of the gas times the square of its velocity. Along a diverging surface (that is, a surface that tails away from the mean flow direction), as is the case on the suction side of an airfoil (such as a fan blade or helicopter blade), the flow along the surface is accompanied by a pressure rise, which is accomplished only by conversion of momentum flux. The momentum and energy of the gas along the surface is consumed in overcoming the pressure rise and friction so that the gas particles are finally brought to rest and the flow begins to break away from the wall resulting in boundary layer separation downstream of the separation point.

Boundary layer separation typically results in the termination of pressure rise (recovery) and hence loss in performance (e.g., airfoil lift). Boundary layer separation may also result in dramatic decreases in system efficiency due to conversions of flow energy into turbulence and eventually into heat.

BRIEF DESCRIPTION OF THE INVENTION

According to one aspect of the invention, an aircraft is provided and includes a fuselage including a top and a tail, a main rotor apparatus disposed at the top of the fuselage, which rotates one or more rotors to generate lift, and an active flow control (AFC) system. The AFC system includes plasma actuators configured to generate plasma at a location adjacent to the main rotor apparatus and/or at the tail of the fuselage.

In accordance with additional or alternative embodiments, the plasma actuators are elongate.

In accordance with additional or alternative embodiments, the plasma actuators are curved.

In accordance with additional or alternative embodiments, the main rotor apparatus includes a sail fairing and coaxial sets of counter rotating rotor blades separated by the sail fairing, the fuselage includes a hub fairing at the top of the fuselage adjacent to the main rotor blade, and the plasma actuators are disposed on one or both of the sail fairing of the main rotor apparatus and the hub fairing of the fuselage.

In accordance with additional or alternative embodiments, one or more of the main rotor apparatus and the top of the fuselage are formed to define blowers.

According to another aspect of the invention, an aircraft is provided and includes a fuselage having a main portion, a top portion at an upper part of the main portion and a tail portion at an aft end of the main portion, the fuselage comprising a hub pylon at the top portion and an aft fuselage section at the tail portion, a main rotor apparatus disposed at the top portion and comprising a sail fairing between upper and lower rotor hubs, upper blades extending from the upper rotor hub and lower blades extending from the lower rotor hub, an auxiliary propulsor section disposed at the tail portion and an active flow control (AFC) system including plasma actuators configured to generate plasma at one or more of the main portion proximate to the hub pylon, the hub pylon, the sail fairing and the aft fuselage section.

In accordance with additional or alternative embodiments, the hub pylon includes an upper surface and lateral surfaces extending from the main portion to the upper surface.

In accordance with additional or alternative embodiments, the plasma actuators are disposed on one or more of the upper and lateral surfaces of the hub pylon and on the main portion of the fuselage proximate to the hub pylon.

In accordance with additional or alternative embodiments, the plasma actuators are elongate and extend along the lateral surfaces of the hub pylon or along the main portion proximate to the hub pylon.

In accordance with additional or alternative embodiments, the plasma actuators are curved along the lateral surfaces of the hub pylon.

In accordance with additional or alternative embodiments, the sail fairing includes a tapered trailing edge portion terminating aft of the upper and lower rotor hubs.

In accordance with additional or alternative embodiments, the plasma actuators are disposed on one or more of lateral and upper surfaces of the sail fairing.

In accordance with additional or alternative embodiments, the plasma actuators are elongate and extend along the lateral surfaces of the sail fairing.

In accordance with additional or alternative embodiments, the aft fuselage section includes stabilizer elements and a pylon protruding from upper surfaces of the stabilizer elements and including an upper pylon surface, wherein the plasma actuators are disposed on one or more of the upper surfaces of the stabilizer elements and the upper pylon surface.

In accordance with additional or alternative embodiments, one or more of the main rotor apparatus and the top portion are formed to define blowers.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, an active flow control system including one or more plasma actuators is provided. The system may be employed to reduce aircraft drag and, in particular, to reduce high-speed coaxial rotorcraft drag by increasing overall aircraft lift-to-equivalent-drag ratios.

Figure 5:
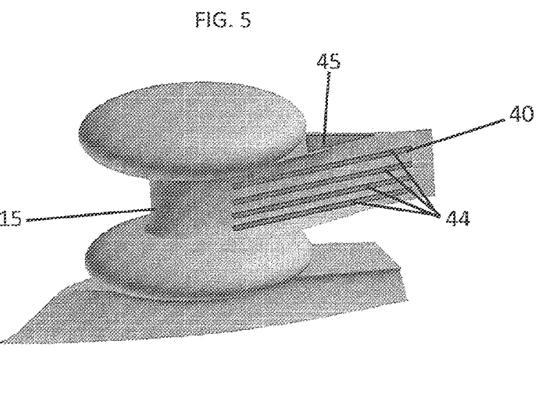
FIG. 5 is a perspective view of a portion of a main rotor apparatus of the aircraft of FIG. 1 in accordance with embodiments.
Figure 6:
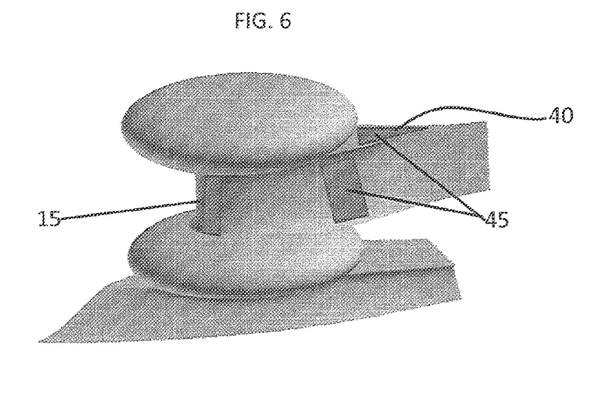
FIG. 6 is a perspective view of a portion of a main rotor apparatus of the aircraft of FIG. 1 in accordance with embodiments.
Figure 7:
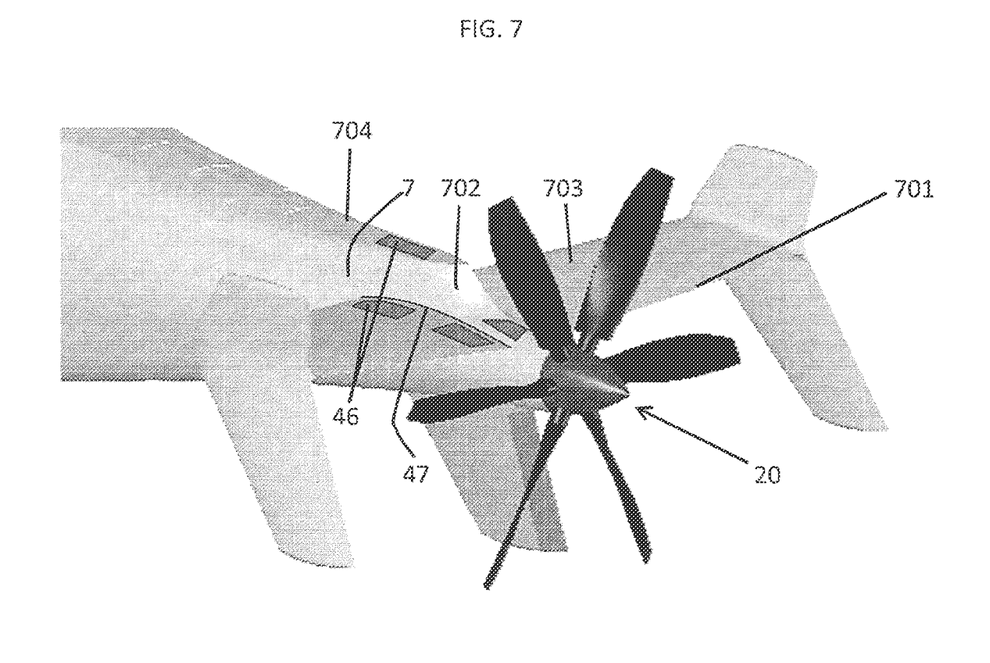
FIG. 7 is a perspective view of an aft section of the fuselage of the aircraft of FIG. 1 in accordance with embodiments.
Figure 8:
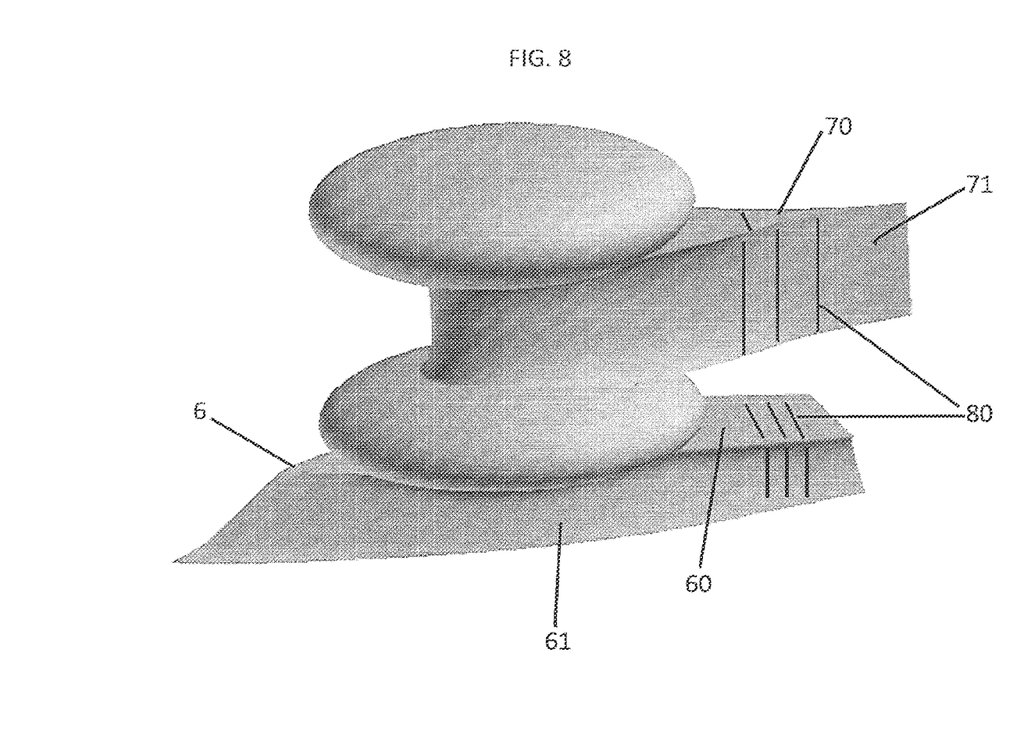
FIG. 8 is a perspective view of a portion of a main rotor apparatus of the aircraft of FIG. 1 in accordance with further embodiments
Figure 9:
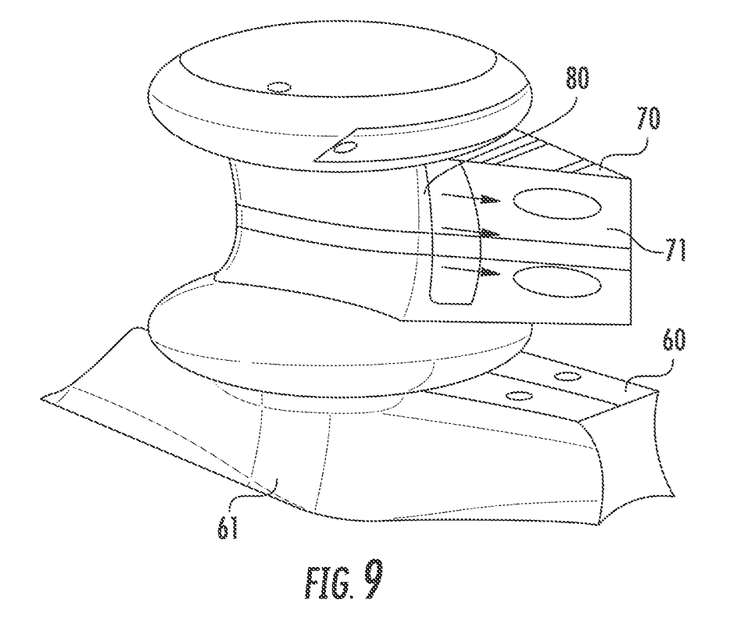
FIG. 9 is a perspective view of a portion of a main rotor apparatus of the aircraft of FIG. 1 in accordance with further embodiments.
Figure 10:
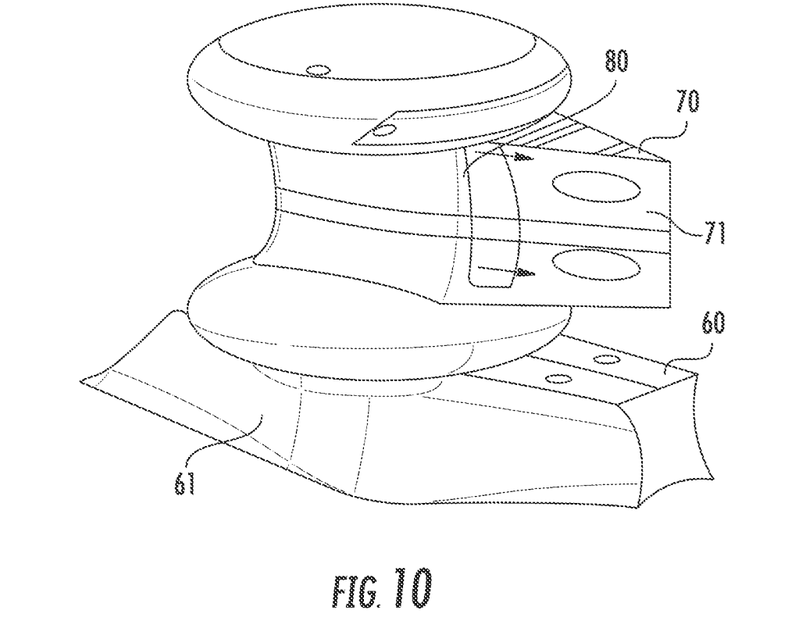
FIG. 10 is a perspective view of a portion of a main rotor apparatus of the aircraft of FIG. 1 in accordance with further embodiments.
Figure 11:
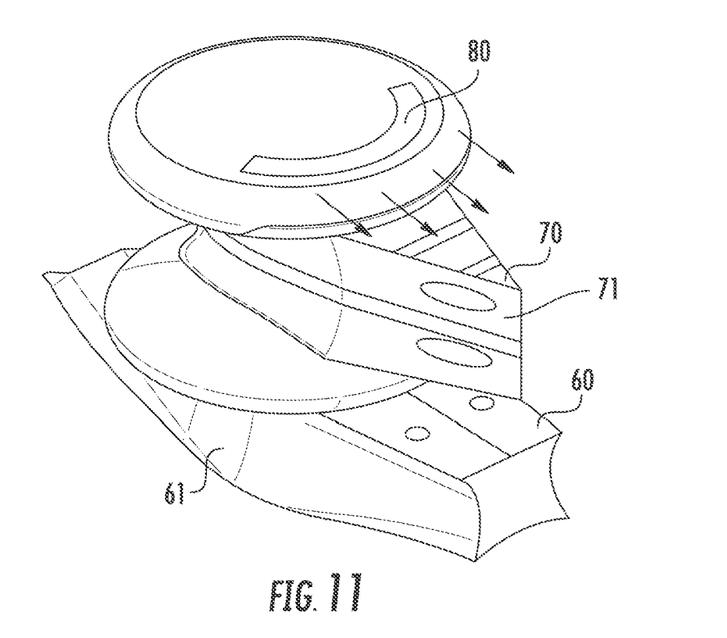
FIG. 11 is a perspective view of a portion of a main rotor apparatus of the aircraft of FIG. 1 in accordance with further embodiments.
Figure 12:
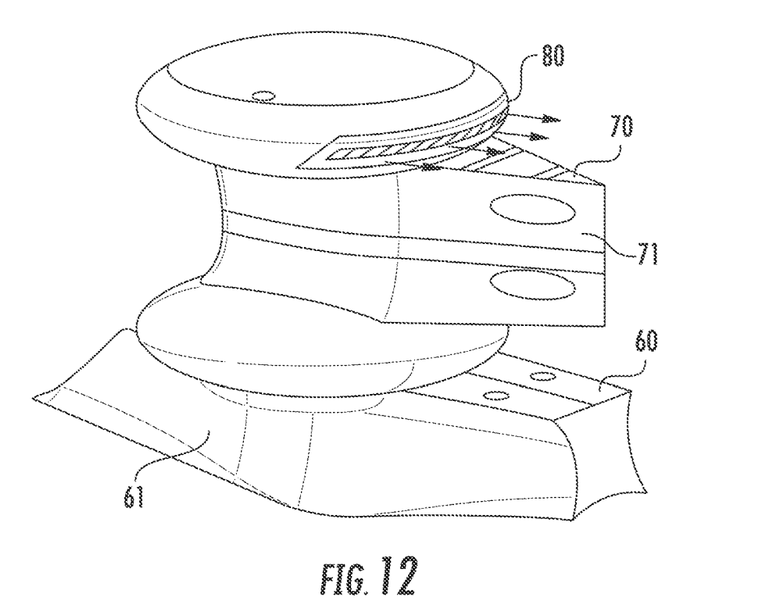
FIG. 12 is a perspective view of a portion of a main rotor apparatus of the aircraft of FIG. 1 in accordance with further embodiments.

With reference to FIGS. 1-7, an aircraft 1 is provided and may be configured as a compound helicopter including a fuselage 2. The fuselage 2 has a main portion 3 that is formed to define a cabin sized to accommodate a pilot and one or more crewmen or passengers, a top portion 4 at an upper part of the main portion 3 and a tail portion 5 at an aft end of the main portion 3. The fuselage 2 includes a hub pylon 6 (see FIG. 2) at the top portion 4 and an aft fuselage section 7 at the tail portion 5. As shown in FIG. 7, the aft fuselage section 7 includes stabilizer elements 701 and a pylon 702. The stabilizer elements 701 include upper surfaces 703 thereof and the pylon 702 protrudes from the upper surfaces 703 and includes an upper pylon surface 704.

Figure 3:
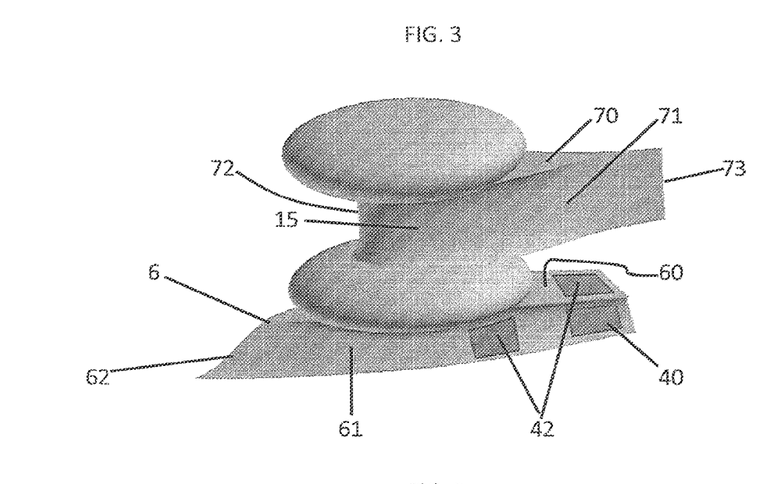
FIG. 3 is a perspective view of a portion of a main rotor apparatus of the aircraft of FIG. 1 in accordance with embodiments.

As shown in FIG. 3, the hub pylon 6 includes an upper surface 60 and first and second lateral surfaces 61. The upper surface 60 may be generally planar or flat and may taper in an aft direction. The tapering of the upper surface 60 may be in the width direction (i.e., from the first lateral surface 61 to the second lateral surface 62) or in the height direction (i.e., relative to the top portion 4). The first and second lateral surfaces 61 extend substantially vertically from the main portion 3 to the upper surface 60. The first and second lateral surfaces 61 may be aerodynamically shaped and may join at a leading edge 62. In addition, in the case where the upper surface 60 is tapered in the width direction, the first and second surfaces 61 may join at a trailing edge as well. Further, in the case where the upper surface 60 is tapered in the height direction, the respective thicknesses of the first and second lateral surfaces 61 may be similarly tapered.

Figures 1, 2:
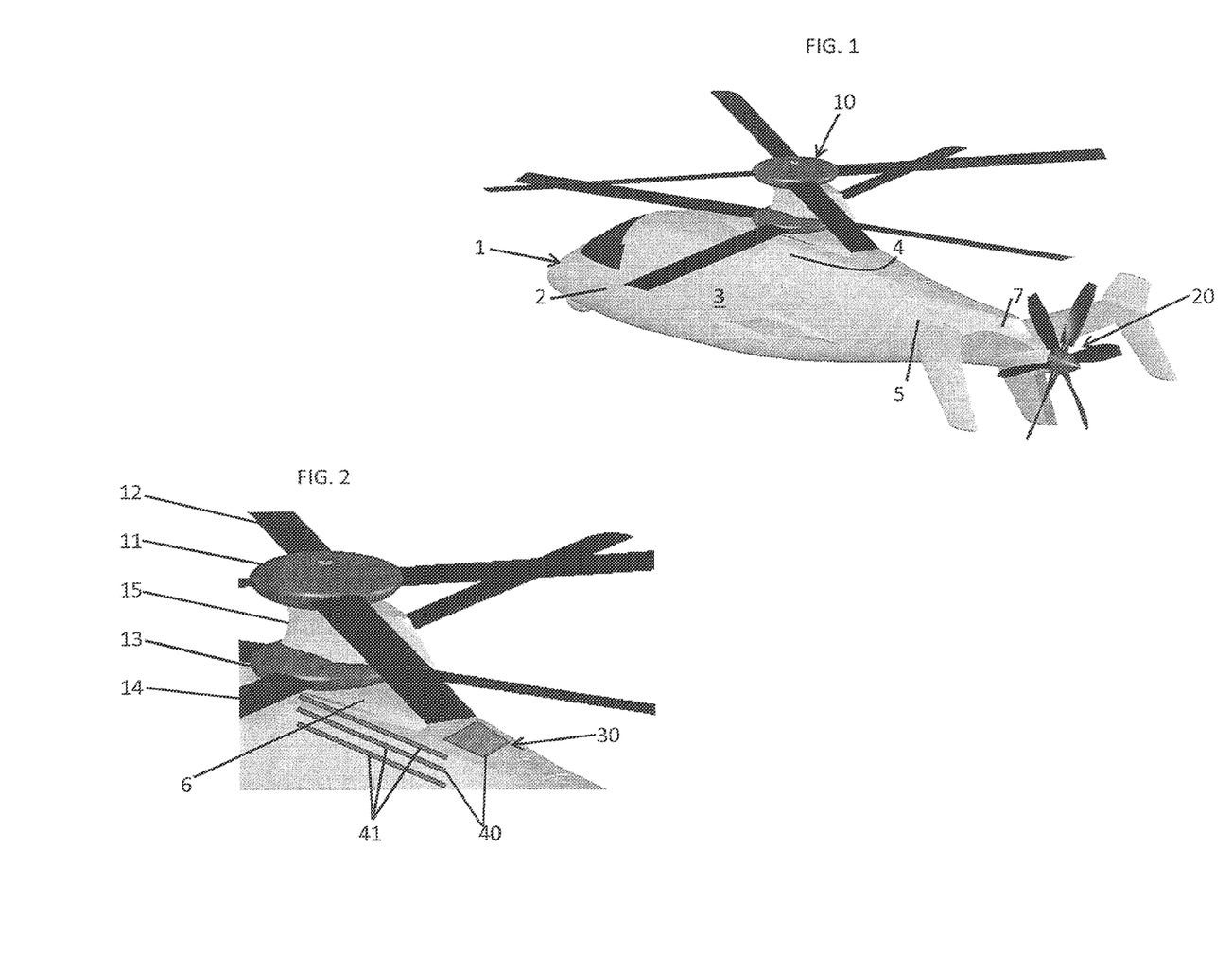
FIG. 1 is a perspective view of an aircraft in accordance with embodiments.
FIG. 2 is a perspective view of a main rotor apparatus of the aircraft of FIG. 1 in accordance with embodiments.

The aircraft 1 further includes a main rotor apparatus 10 and an auxiliary propulsor section 20. The main rotor apparatus 10 is disposed at the top portion 4 and may be configured as a coaxial, counter-rotating main rotor apparatus. In such cases, the main rotor apparatus 10 includes main rotor shafts, an upper rotor hub 11, upper rotor blades 12 extending radially outwardly from the upper rotor hub 11, a lower rotor hub 13, lower rotor blades 14 extending radially outwardly from the lower rotor hub 13 and a sail fairing 15. The upper rotor hub 11 is coupled to one of the rotor shafts such that the upper rotor hub 11 and the upper rotor blades 12 are rotatable about the one of the rotor shafts. The lower rotor hub 13 is coupled to the other of the rotor shafts such that the lower rotor hub 13 and the lower rotor blades 14 are rotatable about the other of the rotor shafts. The sail fairing 15 is sandwiched between the upper rotor hub 11 and the lower rotor hub 13.

The sail fairing 15 includes an upper surface 70 and first and second lateral surfaces 71. The upper surface 70 may be generally planar or flat and may taper in an aft direction. The tapering of the upper surface 70 may be in the width direction (i.e., from the first lateral surface 71 to the second lateral surface 71) or in the height direction (i.e., relative to the top portion 4). The first and second lateral surfaces 71 extend substantially vertically to the upper surface 70 and may be aerodynamically shaped such that they join at a leading edge 72 and at a trailing edge 73. Further, in the case where the upper surface 70 is tapered in the height direction, the respective thicknesses of the first and second lateral surfaces 71 may be similarly tapered. While the fairing 15 is shown as oriented with a taper to the aft of the aircraft 1, it is understood that the orientation can be in other directions according to a direction of travel of the aircraft 1 in aspects.

The aircraft 1 also includes an engine, a transmission and a flight computer. During flight operations, the engine generates power and the transmission system transmits the generated power to the main rotor shafts and to the auxiliary propulsor section 20 in accordance with commands inputted by the pilot and the flight computer. This transmission of power causes the respective rotations of the upper rotor hub 11/upper rotor blades 12 and the lower rotor hub 13/lower rotor blades 14 about the rotor shafts to thereby generate lift and thrust for the aircraft 1. The transmission of power further causes the auxiliary propulsor section 20 to operate and to generate additional thrust for the aircraft 1.

Although the aircraft 1 has been described above as a compound helicopter with coaxial, counter-rotating main rotors as a main rotor apparatus 10 and an auxiliary propulsor section 20, it will be understood that this is not necessary and that the following description is applicable to other types of aircraft, including conventional non-coaxial aircraft, such as single main rotor aircraft, mono-axial aircraft, tilt rotor aircraft, and fixed wing aircraft. Further, while shown with the auxiliary propulsor section 20 at the aft fuselage section 7, it is understood that the auxiliary propulsor section 20 can be on a side of the aircraft 1 in other aspects.

The aircraft 1 further includes an active flow control (AFC) system 30. The AFC system 30 includes multiple plasma actuators 40 disposed at one or more locations around the fuselage 2 and configured to generate, and in some cases exhaust, plasma at one or more of the main portion 3 proximate to the hub pylon 6, the hub pylon 6, the sail fairing 15 and the aft fuselage section 7. As used herein, the term "plasma" can refer to ionized air or other similar definitions. The plasma actuators 40 work by forming a low-temperature plasma between a pair of asymmetric electrodes by application of a high-voltage alternating current (AC) signal across the electrodes. Consequently, air molecules from the air surrounding the electrodes are ionized and accelerated through the electric field. The plasma actuators 40 thus induce local flow speed perturbations, which will be developed downstream to a vortex sheet. As a result, the plasma actuators 40 can behave as vortex generators but have no mechanical moving parts and do not require any drilling holes on aerodynamic surfaces or duct/piping components.

In accordance with embodiments, the plasma actuators 40 may be disposed on one or more of the upper surface 60 and the first and second lateral surfaces 61 of the hub pylon 6 and on the main portion 3 of the fuselage 2 at a location proximate to the hub pylon 6. In these cases or other cases, the plasma actuators 40 may be provided as elongate plasma actuators 41 that extend along the first and second lateral surfaces 61 of the hub pylon 6 or along the main portion 3 as shown in FIG. 2 or as plate-shaped plasma actuators 42 that are disposed on an upper section of the main portion 3, the upper surface 60 or the first and second lateral surfaces 61 as shown in FIG. 3. As shown, the plate-shaped plasma actuators 42 are substantially rectangular with edges following a contour of the upper surface 60 if on the upper surface 60, or the edge between the lateral surfaces 61 and the upper surface 60 if on the lateral edges 61.

Figure 4:
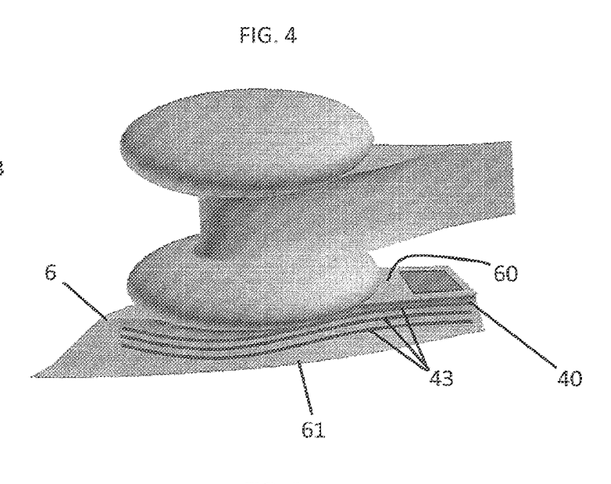
FIG. 4 is a perspective view of a portion of a main rotor apparatus of the aircraft of FIG. 1 in accordance with embodiments.

Alternatively, the plasma actuators 40 may be provided as curved plasma actuators 43 that are curved along the first and second lateral surfaces 61 of the hub pylon 6 as shown in FIG. 4, which can be used in addition to the plate shaped actuator 42 shown on the upper surface 60. As shown, the curved plasma actuators 43 are disposed in a set on each lateral surface 61, with each set including three curved plasma actuators 43 which are substantially parallel to each other and following the taper of the lateral surface 61 and substantially parallel to an edge between the upper surface 60 and the lateral surface 61. While shown in combination in FIG. 4, it is understood that the curved plasma actuators 43 can be used without the plate actuator 41 in other aspects. Further, each set of curved plasma actuators 43 can include other numbers of curved plasma actuators 43, including only a single curved plasma actuator 43.

In accordance with further embodiments shown in FIGS. 5 and 6, the plasma actuators 40 may be disposed on one or more of the first and second lateral surfaces 71 of the sail fairing 15 and on the upper surface 70 of the sail fairing 15. In these or other cases, the plasma actuators 40 may be provided as elongate plasma actuators 44 that extend along the first and second lateral surfaces 71 or as plate-shaped plasma actuators 45 that are disposed on the upper surface 70 or the first and second lateral surfaces 71. While not shown, it is understood that the sail fairing 15 can include combinations of the elongate plasma actuators 44 and plate-shaped plasma actuators 45, and the hub pylon 6 can have plasma actuators 40 in addition to the plasma actuators 40 on the sail fairing 15.

In accordance with further embodiments, the plasma actuators 40 may be disposed on one or more of the upper surfaces 703 of the stabilizer elements 701 and the upper pylon surface 704 of the pylon 702. In these or other cases, the plasma actuators 40 may be provided as plate shaped plasma actuators 46 and elongate plasma actuators 47 that run along edges defined at interfaces of the stabilizer elements 701 and the pylon 702. While shown as a combination, it is understood that the plasma actuators 40 may be provided as plate shaped plasma actuators 46 or as elongate plasma actuators 47.

In accordance with still further embodiments and, with reference to FIGS. 8-12, the aircraft 1 may include blower or suction slots 80. Such blower or suction slots 80 may be defined by the upper surface 60 or the first and second lateral surfaces 61 of the hub pylon 6 or by the upper surface 70 or the first and second lateral surfaces 71 of the sail fairing 15.

The descriptions noted above can be applied to lift-offset high-speed coaxial rotorcraft configurations to create favorable interactions between flow-control actuators, engine exhaust and auxiliary propulsor induction over the fuselage 2.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft, comprising:
   a fuselage comprising a top and a tail;
   a main rotor apparatus disposed at the top of the fuselage which rotates one or more rotors to generate lift; and
   an active flow control (AFC) system including plasma actuators configured to generate plasma at a location adjacent to the main rotor apparatus and at the tail of the fuselage.

2. The aircraft according to either of claim 1, wherein the plasma actuators are elongate.

3. The aircraft according to claim 1, wherein the plasma actuators are curved.

4. The aircraft according to claim 1, wherein the main rotor apparatus comprises a sail fairing and coaxial sets of counter rotating rotor blades separated by the sail fairing, the fuselage comprises a hub fairing at the top of the fuselage adjacent to the main rotor blade, and the plasma actuators are disposed on one or both of the sail fairing of the main rotor apparatus and the hub fairing of the fuselage.

5. An aircraft, comprising:
   a fuselage having a main portion, a top portion at an upper part of the main portion and a tail portion at an aft end of the main portion, the fuselage comprising a hub pylon at the top portion and an aft fuselage section at the tail portion;
   a main rotor apparatus disposed at the top portion and comprising a sail fairing between upper and lower rotor hubs, upper blades extending from the upper rotor hub and lower blades extending from the lower rotor hub;
   an auxiliary propulsor section disposed at the tail portion; and
   an active flow control (AFC) system including plasma actuators configured to generate plasma at the tail portion and one or more of the main portion proximate to the hub pylon, the hub pylon, and the sail fairing.

6. The aircraft according to claim 5, wherein the plasma actuators are curved along the lateral surfaces of the hub pylon.

7. The aircraft according to claim 5, wherein the aft fuselage section comprises:
   stabilizer elements; and
   a pylon protruding from upper surfaces of the stabilizer elements and including an upper pylon surface,
   wherein the plasma actuators are disposed on one or more of the upper surfaces of the stabilizer elements and the upper pylon surface.

8. The aircraft according to claim 5, wherein the hub pylon comprises an upper surface and lateral surfaces extending from the main portion to the upper surface.

9. The aircraft according to claim 8, wherein the plasma actuators are disposed on one or more of the upper and lateral surfaces of the hub pylon and on the main portion of the fuselage proximate to the hub pylon.

10. The aircraft according to claim 8, wherein the plasma actuators are elongate and extend along the lateral surfaces of the hub pylon or along the main portion proximate to the hub pylon.

11. The aircraft according to claim 5, wherein the sail fairing comprises a tapered trailing edge portion terminating aft of the upper and lower rotor hubs.

12. The aircraft according to claim 11, wherein the plasma actuators are disposed on one or more of lateral and upper surfaces of the sail fairing.

13. The aircraft according to claim 12, wherein the plasma actuators are elongate and extend along the lateral surfaces of the sail fairing.

\* \* \* \* \*